United States Patent
Tong et al.

(10) Patent No.: US 12,492,935 B2
(45) Date of Patent: Dec. 9, 2025

(54) CAVITATION STATE IDENTIFICATION METHOD DRIVEN BY VIBRATION DATA OF FLUID MACHINERY

(71) Applicant: Zhejiang University, Zhejiang (CN)

(72) Inventors: Zheming Tong, Zhejiang (CN); Hao Liu, Zhejiang (CN)

(73) Assignee: Zhejiang University, Hangzhou (CN)

( * ) Notice: Subject to any disclaimer, the term of this patent is extended or adjusted under 35 U.S.C. 154(b) by 320 days.

(21) Appl. No.: 18/226,778

(22) Filed: Jul. 27, 2023

(65) Prior Publication Data

US 2024/0035467 A1 Feb. 1, 2024

(30) Foreign Application Priority Data

Jul. 27, 2022 (CN) .......................... 202210892583.8

(51) Int. Cl.
*F04B 51/00* (2006.01)
*G01H 3/00* (2006.01)
*G06N 3/04* (2023.01)

(52) U.S. Cl.
CPC ............... *F04B 51/00* (2013.01); *G01H 3/00* (2013.01); *G06N 3/04* (2013.01)

(58) Field of Classification Search
CPC ........................ F04D 29/66–708; G06N 3/02; G06N 3/0464; F04B 11/00; G01H 3/00
USPC .................................................... 706/912, 15
See application file for complete search history.

(56) References Cited

U.S. PATENT DOCUMENTS

| | | | | |
|---|---|---|---|---|
| 5,332,356 A | * | 7/1994 | Gulich | F04D 29/669 |
| | | | | 702/56 |
| 6,757,665 B1 | * | 6/2004 | Unsworth | G06N 3/088 |
| | | | | 706/5 |
| 9,255,578 B2 | * | 2/2016 | Sharpe, Jr. | F04B 49/065 |
| 2020/0388140 A1 | * | 12/2020 | Gomez | F04B 49/065 |

FOREIGN PATENT DOCUMENTS

EP 1286056 B1 * 10/2005 ......... F04D 15/0245

OTHER PUBLICATIONS

Cavitation analysis through CFD in industrial pumps: A review, by Orlandi (Year: 2023).*
A Review of Experimental Detection Methods of Cavitation in Centrifugal Pumps and Inducers, by Mousmoulis (Year: 2019).*
(Continued)

*Primary Examiner* — Thomas Fink (57) ABSTRACT

A cavitation state identification method driven by vibration data of fluid machinery is disclosed in the present invention, and belongs to the field of big data learning models. According to the present invention, an adaptive neural network is trained by means of a cavitation data set to form a cavitation state identification model, such that vibration signal sequences can be collected online by all vibration sensors arranged at different positions of a target centrifugal pump, the collected vibration signal sequences are input into the cavitation state identification model obtained by training, and a current real-time cavitation intensity of the target centrifugal pump is predicted online. Moreover, the cavitation intensity predicted in the present invention can use a more detailed quantitative label, such that fine-grained prediction about a cavitation development degree is achieved.

10 Claims, 4 Drawing Sheets

(56) References Cited

OTHER PUBLICATIONS

Detection of Cavitation Phenomena in Reciprocating Pumps using a High-Speed Camera, by Opitz (Year: 2010).*
Visualization of Rotating Cavitation Oscillation Mechanism in a Turbopump Inducer, by Kim (Year: 2019).*
Direct and indirect measurement techniques of cavitation intensity: a brief review, by Triawan (Year: 2019).*

* cited by examiner

CAVITATION STATE IDENTIFICATION METHOD DRIVEN BY VIBRATION DATA OF FLUID MACHINERY

CROSS REFERENCE TO RELATED APPLICATIONS

The present application claims the benefit of Chinese Patent Application No. 202210892583.8 filed on Jul. 27, 2022, the contents of which are incorporated herein by reference in their entirety.

TECHNICAL FIELD

The present invention belongs to the field of big data learning models, and particularly relates to a cavitation state identification method driven by vibration data of fluid machinery.

BACKGROUND

As a kind of general-purpose machinery for transferring fluids, pumps are widely used in fields of renewable energy power generation, petrochemicals, aerospace, urban water supply, etc., accounting for nearly 18% of global energy consumption. During pump operation, a localized pressure reduction in the flow-passing overflow components may induce cavitation.

Cavitation interferes with and destroys an energy exchange law in an impeller, causing a decrease in the overall performance of the pump, and inducing vibration noise and cavitation damage. Therefore, accurately grasping the pump cavitation phenomenon is significant to the efficient, safe and stable operation of the pump.

Current methods for monitoring cavitation in centrifugal pumps include an energy drop method, a high-speed photography method, and identification methods based on measurements of noise, pressure pulsations, electrical currents, and vibration signals. There is a significant lag and non-equivalence between a percentage decrease in head and a cavitation development degree, that is, there is no significant decrease in the monitored head of the pump when cavitation has developed to a degree visible to the naked eye in the pump. Therefore, the percentage of head drop method cannot accurately characterize a real cavitation process of the pump, and there is a significant error in applying such an index for pump cavitation monitoring. The high-speed photography method cannot be directly applied to real industrial scenes, but it can provide the most accurate evolution of cavitation. A traditional signal-based cavitation fault diagnosis method mainly compares manually extracted feature matrices in healthy and cavitation states and applies classification algorithms for fault diagnosis.

In recent years, the combination of a deep learning technology and a big data application has developed rapidly and has been widely used in the field of artificial intelligence. Compared to manually extracting a limited number of artificially defined cavitation fault features, deep learning can automatically extract features and learn deeply hidden fault features through multi-level nonlinear mapping relations, the most representative of which is a convolutional neural network model, which has made breakthroughs in fields such as computer vision and natural language processing. The convolutional neural network model is particularly suitable for automatic fault diagnosis of mechanical systems under complex working conditions due to the strong self-mining capability and invisible feature characterization capability. Although some studies have applied the convolutional neural network model to the fault diagnosis of mechanical components such as bearings and gears, there are fewer studies on the online automatic identification of cavitation for pumps, especially centrifugal pumps. Besides, most of the research still focuses on a two-dimensional convolutional neural network (CNN), and input of the CNN still needs manual extraction of features, which is then converted to two-dimensional images, thus weakening its powerful feature self-learning capability. One-dimensional time sequence signals, such as vibration, have certain spatial and temporal correlations, and artificial conversion to a two-dimensional form somewhat destroys the spatial correlation of the signals, potentially drowning out the fault information.

Existing cavitation identification methods usually divide the cavitation states into a no cavitation state, a weak cavitation state, a severe cavitation state, etc. artificially, use coarse-grained cavitation labels to train the machine learning model, and then use pattern recognition and other techniques to identify the cavitation states. Identification results are also rougher because input sample labels cannot accurately characterize the cavitation development degree.

Therefore, how to solve the above deficiencies in cavitation state identification is a technical problem that needs to be solved urgently.

SUMMARY

In order to solve the problems in the prior art that manual extraction of cavitation features is time-consuming and labor-intensive and cannot accurately characterize cavitation, cavitation identification is inaccurate and "end-to-end" online automatic identification cannot be achieved through secondary processing due to coarse-grained cavitation labels, etc., the present invention provides a cavitation state identification method driven by vibration data of fluid machinery.

The present invention employs a specific technical solution as follows.

The present invention provides a cavitation state identification method driven by vibration data of fluid machinery, including:

S1: obtaining a cavitation data set constructed for a target centrifugal pump, where each training sample in the cavitation data set includes input data and a label, the input data is vibration signal sequences collected by all vibration sensors arranged at different positions of the centrifugal pump under one cavitation condition, and the label is a cavitation intensity of the centrifugal pump under the cavitation condition corresponding to the input data; and the cavitation intensity is obtained by using an external imaging instrument to take an image of an impeller region in the pump during an operation process of the centrifugal pump with a transparent housing, and further computing a ratio of an area of a cavitation region identified from the image to an area of an impeller flow passage;

S2: training an adaptive neural network by means of the cavitation data set, to obtain a cavitation state identification model, where the adaptive neural network takes the vibration signal sequences collected by all the vibration sensors arranged at different positions of the centrifugal pump as input, extracts high-dimensional features of the input vibration signal sequences, and finally outputs a corresponding cavitation intensity prediction value by means of classification and regression; and S3: collecting the vibration signal sequences online by all the vibration sensors arranged at different positions of the target centrifugal pump, inputting the collected vibration signal sequences into the cavitation state identification model obtained by training, and predicting a current real-time cavitation intensity of the target centrifugal pump online.

Preferably, after a plurality of groups of online prediction results are obtained for the target centrifugal pump, a vibration signal sequence with a confidence coefficient higher than a threshold and a corresponding cavitation intensity are constructed as a new training sample, and expanded into the cavitation data set, the adaptive neural network is retrained, the cavitation state identification model is updated, and the model performs regular autonomous learning.

Preferably, the cavitation data set is obtained by installing a test pump in a test system for a multi-working condition test, a housing of the test pump is made of a transparent material, and the internal structures of the test pump are identical to that of the target centrifugal pump.

Preferably, a specific method of the multi-working condition test includes:

sampling different flow conditions within a flow regulation range of the target centrifugal pump, and performing a cavitation test on the test pump under each flow condition; during each cavitation test, firstly, guaranteeing that a flow in the test pump is stable under a current flow condition, then reducing inlet pressure of the test pump gradually according to a preset pressure control point, to promote the generation and development of cavitation in the test pump gradually, maintaining a period of steady state time at each pressure control point, collecting vibration signal sequences by vibration sensors arranged at different positions on the test pump separately in the period of steady state time, and simultaneously taking an image of an impeller region in the pump through the transparent shell by means of an imaging instrument arranged outside the test pump; and identifying a cavitation region and an impeller flow passage according to the captured image of the impeller region in the pump, and taking a ratio of the number of pixels of the cavitation region to the number of pixels of the impeller flow passage as a cavitation intensity under the corresponding flow condition and pressure control point.

Preferably, when the test pump is subject to the cavitation test, the test pump is connected to a tank for supplying water, and the inlet pressure of the test pump is changed by regulating a negative pressure degree in the tank.

Preferably, the adaptive neural network uses an adaptive one-dimensional convolutional neural network model, and the model is formed by cascading an input layer, a plurality layers of convolutional pooling modules, a fully-connected layer and an output layer;

in the input layer, the input vibration signal sequences are firstly normalized, and then the vibration signal sequence of each sensor is divided into a series of sequence slices in a sliding manner with a fixed time window, where each sequence slice has a length at least covering the information in one rotation period of a centrifugal pump impeller;

each layer of convolutional pooling module is composed of a convolutional layer and a max pooling layer in cascade, where input of the convolutional layer is output of a previous network layer, activation function output of the convolutional layer serves as input of the max pooling layer, and output of the max pooling layer serves as input of a next network layer; and the max pooling layer of the last layer of convolutional pooling module adaptively regulates a size of a convolution kernel, such that an output feature vector is adapted to an input dimension of the output layer;

in the fully-connected layer, fully-connected operation is performed on the feature vector output by the last layer of convolutional pooling module; and in the output layer, a prediction label of the cavitation intensity is obtained by performing classification and regression on a feature vector output by the fully-connected layer.

Preferably, in the adaptive neural network, a probability distribution of a cavitation intensity label corresponding to the vibration signal sequence collected by each vibration sensor is output separately, then the probability distributions of the cavitation intensity labels corresponding to all the vibration sensors are averaged, and a cavitation intensity label with a maximum probability is selected from the average probability distribution as the final output cavitation intensity prediction value.

Preferably, the max pooling layer performs zero-padding max pooling operation on an input feature.

Preferably, when the adaptive neural network is trained in S2, all cavitation intensity labels are grouped first, then the cavitation data set is divided according to the cavitation intensity labels, each group of cavitation intensity labels obtains a data sub-set, and each data sub-set is used to train an adaptive neural network, to form a corresponding cavitation state identification model; and when online prediction is performed in S3, the vibration signal sequences collected online are input into each cavitation state identification model, current cavitation intensity labels of the target centrifugal pump and confidence coefficients of the current cavitation intensity labels are predicted online separately, and a cavitation intensity label with a highest confidence coefficient is selected as the final real-time cavitation intensity.

Preferably, the imaging instrument is a high-speed camera.

Preferably, the vibration sensors on the target centrifugal pump are respectively arranged on a pump inlet, a pump outlet and a housing between the inlet and the outlet.

Compared with the prior art, the present invention has the following beneficial effects:

1) The present invention trains a cavitation state identification model which could be capable of predicting a cavitation intensity quantification value by fusing multi-source data such as vibration signals and cavitation images under different operation conditions of the centrifugal pump, and further implements end-to-end and real-time diagnosis of a cavitation state in the centrifugal pump.

2) The cavitation state identification model in the present invention can use an adaptive one-dimensional convolutional neural network. The network can use an original time-domain signal sequence as input without other complex conversion, so as to greatly simplify diagnosis steps, reduce requirements on the amount of computation, and achieve a purpose of real-time diagnosis with the help of edge devices.

3) The present invention utilizes an imaging instrument such as a high-speed camera to take images of a cavitation state in a pump impeller, and carries out cavity boundary identification on the captured images by means of an image identification segmentation technology, such that a proportion of an identified cavitation region to an impeller flow passage area is used as a quantitative characterization index of the cavitation intensity, and fine-grained prediction of a cavitation development degree is achieved.

BRIEF DESCRIPTION OF THE DRAWINGS

Description of symbols in the figures: water storage tank 1, inlet liquid flowmeter 2, inlet differential pressure sensor 3, test pump 4, drive motor 5, outlet differential pressure sensor 6, outlet valve 7, outlet liquid flowmeter 8, outlet regulating valve 9, cyclone separator 10, exhaust valve 11, vacuum pump 12, water drain valve 13, and high-speed camera 14.

DETAILED DESCRIPTION OF THE EMBODIMENTS

In order to make the foregoing objective, features, and advantages of the present invention clearer and more comprehensible, the specific implementations of the present invention will be described in detail below in conjunction with the accompanying drawings. Numerous specific details are set forth in the following description to facilitate a thorough understanding of the present invention. However, the present invention can be practiced in many other ways than those described herein, and those skilled in the art may make similar modifications without departing from the spirit of the present invention, and therefore the present invention is not limited by the specific embodiments disclosed below. The technical features in the embodiments of the present invention may be combined accordingly on the premise that there is no mutual conflict.

In the description of the present invention, it should be understood that when an element is considered to be "connected" to another element, it may be directly connected to another element or may be indirectly connected to another element, that is, by means of an intervening element. On the contrary, when an element is described as being "directly connected to" another element, an intervening element is absent.

In the description of the present invention, it should be understood that the terms "first" and "second" are merely used for describing purposes and cannot be understood as indicating or implying relative importance implicitly indicating the number of indicated technical features. Thus, features defined with "first" and "second" may explicitly or implicitly include at least one of the features.

Figure 1:
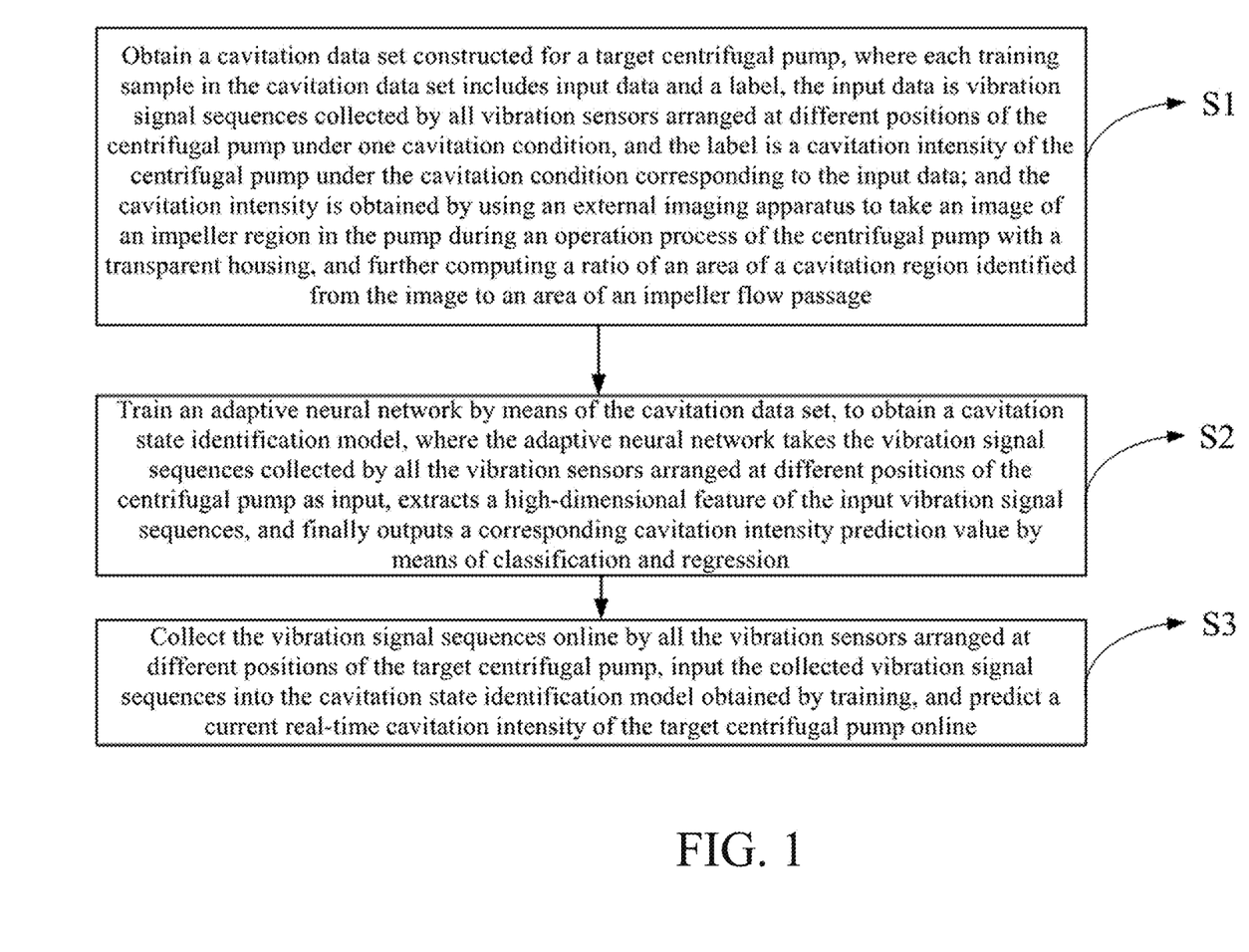
FIG. 1 is a step flowchart of a cavitation state identification method driven by vibration data of fluid machinery.

As shown in FIG. 1, in a preferred embodiment of the present invention, a cavitation state identification method driven by vibration data of fluid machinery is provided. The cavitation state identification method includes S1-S3. An implementation manner of each step is described as follows:

S1: obtain a cavitation data set constructed for a target centrifugal pump, where each training sample in the cavitation data set includes input data and a label, the input data is vibration signal sequences collected by all vibration sensors arranged at different positions of the centrifugal pump under one cavitation condition, and the label is a cavitation intensity of the centrifugal pump under the cavitation condition corresponding to the input data; and the cavitation intensity is obtained by using an external imaging instrument to take an image of an impeller region in the pump during an operation process of the centrifugal pump with a transparent housing, and further computing a ratio of an area of a cavitation region identified from the image to an area of an impeller flow passage.

It should be noted that the target centrifugal pump in the present invention is a centrifugal pump that needs to be subsequently actually detected online, that is, the centrifugal pump used when a cavitation data set is constructed needs to be in the same form as the centrifugal pump that is subsequently actually predicted online. However, since an image of an impeller region in the pump needs to be taken when a sample label is constructed in the present invention, a housing of the target centrifugal pump needs to be replaced with a transparent material, to form a test pump dedicated for testing.

As a preferred implementation of the embodiment of the present invention, the cavitation data set may be obtained by installing a test pump in a test system for a multi-working condition test. A housing of the test pump is made of a transparent material, and an internal structure of the test pump is identical to that of the target centrifugal pump. Each cavitation condition in the present invention may be constructed by changing parameters such as flow in the test pump and inlet pressure of the test pump. The test pump may obtain corresponding data under the cavitation conditions.

Further, as a preferred implementation of the embodiment of the present invention, a specific method of the multi-working condition test may be implemented in the following manner.

Different flow conditions are sampled within a flow regulation range of the target centrifugal pump, and a cavitation test is performed on the test pump under each flow condition. During each cavitation test, corresponding test data may be obtained according to the following steps: firstly, guarantee that a flow in the test pump is stable under a current flow condition, then reduce inlet pressure of the test pump gradually according to a preset pressure control point, to generate cavitation in the test pump gradually, maintain a period of steady state time at each pressure control point, collect a vibration signal sequence by vibration sensors arranged at different positions on the test pump separately in the period of steady state time, and simultaneously take an image of an impeller region in the pump through the transparent shell by means of an imaging instrument arranged outside the test pump; and identify a cavitation region and an impeller flow passage according to the captured image of the impeller region in the pump, and take a ratio of the number of pixels of the cavitation region to the number of pixels of the impeller flow passage as a cavitation intensity under the corresponding flow condition and pressure control point.

It should be noted that the pressure control points can be regulated according to an actual situation. Typically, a distance between the pressure control points may be set larger in an early stage of the test, and the distance between the pressure control points may be gradually reduced when a cavitation occurrence position is closed.

It should be noted that the positions of the vibration sensors arranged on the test pump may be optimized according to an actual situation. Reference may also be made to distribution modes in the prior art, and the vibration sensors should be distributed at different key positions of the pump case as far as possible. As a preferred implementation of the embodiment of the present invention, the vibration sensors may be respectively arranged on the inlet, outlet and case of the pump.

When the test pump is subject to a cavitation test, a corresponding test system may be constructed. In order to regulate an inlet pressure of the test pump in the present invention, the test pump may be connected to a tank for supplying water, and then a vacuum pump is used to regulate a negative pressure degree in the tank, so as to change the inlet pressure of the test pump. The flow of the test pump may be achieved by setting a valve on a pipe, etc., which is not limited.

As a preferred implementation of the embodiment of the present invention, in order to guarantee reliability of image collection, the imaging instrument may be a high-speed camera.

S2: train an adaptive neural network by means of the cavitation data set, to obtain a cavitation state identification model, where the adaptive neural network takes the vibration signal sequences collected by all the vibration sensors arranged at different positions of the centrifugal pump as input, extracts a high-dimensional feature of the input vibration signal sequences, and finally outputs a corresponding cavitation intensity prediction value by means of classification and regression.

It should be noted that the adaptive neural network is an artificial neural network having an adaptive learning capability. A specific structure of the adaptive neural network is not limited as long as the adaptive neural network may be used to predict the cavitation intensity in the present invention.

Figure 4:
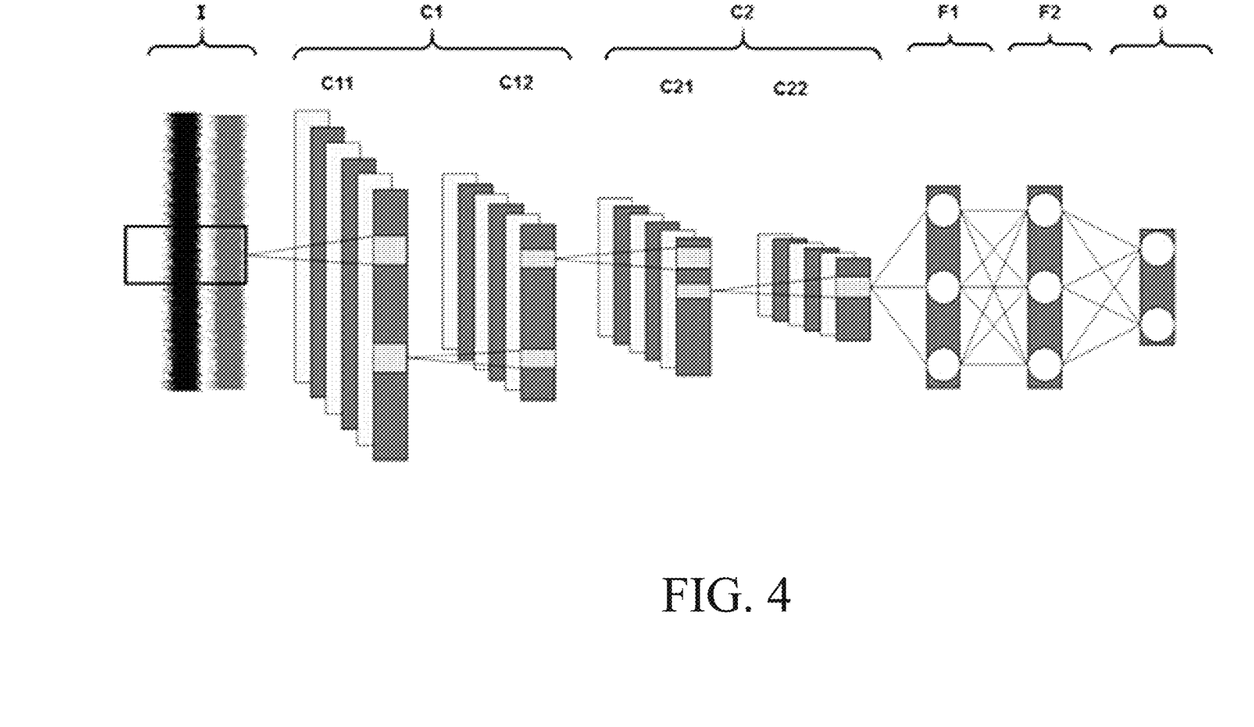
FIG. 4 shows a structure of an adaptive one-dimensional convolutional neural network model established in an embodiment of the present invention.

As a preferred implementation of the embodiment of the present invention, the adaptive neural network uses an adaptive one-dimensional convolutional neural network model. The adaptive one-dimensional convolutional neural network model is formed by cascading an input layer, a plurality layers of convolutional pooling modules, a fully-connected layer and an output layer. Specific functions and structures of the input layer, the plurality layers of convolutional pooling modules, the fully-connected layer, and the output layer are described in detail below.

1) In the input layer, the input vibration signal sequences are firstly normalized, and then the vibration signal sequence of each sensor is divided into a series of sequence slices in a sliding manner according to a fixed time window, where each sequence slice has a length at least covering one rotation period of a centrifugal pump impeller.

2) Each layer of convolutional pooling module is composed of a convolutional layer and a max pooling layer in cascade, where input of the convolutional layer is output of a previous network layer, activation function output of the convolutional layer serves as input of the max pooling layer, and output of the max pooling layer serves as input of a next network layer; and the max pooling layer of the last layer of convolutional pooling module adaptively regulates a size of a convolution kernel, such that an output feature vector is adapted to an input dimension of the output layer. The max pooling layer performs zero-padding max pooling operation on an input feature.

It should be noted that, the previous network layer of the convolutional layer in each convolutional pooling module needs to be determined according to a module cascaded at a front end of the convolutional pooling module.

3) In the fully-connected layer, fully-connected operation is performed on the feature vector output by the last layer of convolutional pooling module by means of a multilayer perceptron (MLP).

4) In the output layer, a prediction label of the cavitation intensity is obtained by performing classification and regression on a feature vector output by the fully-connected layer.

It should be noted that the input of the adaptive neural network includes vibration signal sequences collected by the plurality of sensors. The adaptive neural network needs to perform corresponding label prediction on the input vibration signal sequences collected by different sensors, and finally fuse all the obtained labels, to output the final cavitation intensity prediction label. A specific fusion method for the labels may uses a voting mechanism or directly fuse distribution probabilities. As a preferred implementation of the embodiment of the present invention, in the adaptive neural network, a probability distribution of a cavitation intensity label corresponding to the vibration signal sequence collected by each vibration sensor is output separately, then the probability distributions of the cavitation intensity labels corresponding to all the vibration sensors are averaged, and a cavitation intensity label with a maximum probability is selected from the average probability distribution as the final output cavitation intensity prediction value.

It should be noted that reference may be made to a neural network training method in the prior art for a training process of the adaptive neural network. Parameters may be iteratively updated for a purpose of minimizing a loss function by setting a loss function. Since the output in the present invention is label classification, the loss function may be set to be a mean square error (MSE).

S3: collect the vibration signal sequences online by all the vibration sensors arranged at different positions of the target centrifugal pump, input the collected vibration signal sequences into the cavitation state identification model obtained by training, and predict a current real-time cavitation intensity of the target centrifugal pump online.

It should be noted that the target centrifugal pump in this step is a centrifugal pump actually applied, and its form is consistent with the aforementioned test pump, but it is not necessary to provide a transparent housing. Installing positions of all vibration sensors on the target centrifugal pump need to be exactly the same as the installing positions on the test pump.

Moreover, in order to solve the problem of prediction accuracy caused by insufficient training samples of the neural network, as a preferred implementation of the embodiment of the present invention, a network self-learning strategy is further set with specific steps:

after a certain number (the number may be set) of online prediction results are obtained for the target centrifugal pump, construct a vibration signal sequence with a confidence coefficient higher than a threshold and a corresponding cavitation intensity as a new training sample, expand the new training sample into the above cavitation data set, retrain the adaptive neural network based on the expanded cavitation data set, update the cavitation state identification model, and make the model perform regular autonomous learning.

Furthermore, based on the same inventive concept as the cavitation state identification method driven by vibration data of fluid machinery provided in the above embodiment, another preferred embodiment of the present invention provides a cavitation state identification system driven by vibration data of fluid machinery. The identification system includes the following functional modules:

- a data set obtaining module configured to obtain a cavitation data set constructed for a target centrifugal pump, where each training sample in the cavitation data set includes input data and a label, the input data is vibration signal sequences collected by all vibration sensors arranged at different positions of the centrifugal pump under one cavitation condition, and the label is a cavitation intensity of the centrifugal pump under the cavitation condition corresponding to the input data; and the cavitation intensity is obtained by using an external imaging instrument to take an image of an impeller region in the pump during an operation process of the centrifugal pump with a transparent housing, and further computing a ratio of an area of a cavitation region identified from the image to an area of an impeller flow passage;
- a network training module configured to train an adaptive neural network by means of the cavitation data set, to obtain a cavitation state identification model, where the adaptive neural network takes the vibration signal sequences collected by all the vibration sensors arranged at different positions of the centrifugal pump as input, extracts a high-dimensional feature of the input vibration signal sequences, and finally outputs a corresponding cavitation intensity prediction value by means of classification and regression; and
- an online prediction module configured to collect the vibration signal sequences online by all the vibration sensors arranged at different positions of the target centrifugal pump, input the collected vibration signal sequences into the cavitation state identification model obtained by training, and predict a current real-time cavitation intensity of the target centrifugal pump online.

Since a principle for solving the problem by the cavitation state identification method driven by vibration data of fluid machinery is similar to that by the cavitation state identification system driven by vibration data of fluid machinery according to the above embodiment of the present invention, for specific implementation forms of the modules of the system in the embodiment, reference may also be made to the specific implementation forms of the method part shown in S1-S3, which is not repeated herein.

Moreover, it should be noted that in the system provided in the above embodiment, execution of the modules is equivalent to a program module that is executed in sequence, such that it essentially executes a data processing flow. Those skilled in the art will clearly appreciate that, for convenience and conciseness of description, reference can be made to corresponding processes in the foregoing method embodiment for specific working processes of the above systems, which is not repeated herein. In the embodiments provided in the present application, the division of steps or modules in the method and system is merely a logical function division, and there may be other division manners in actual implementation, for example, a plurality of modules or steps may be combined or integrated together, and one module or step may also be split.

Hereinafter, the present invention will further illustrate a detailed implementation process of the cavitation state identification method driven by vibration data of fluid machinery in the above embodiment through a specific example, so as to facilitate understanding of the essence of the present invention.

Embodiment

Figure 2:
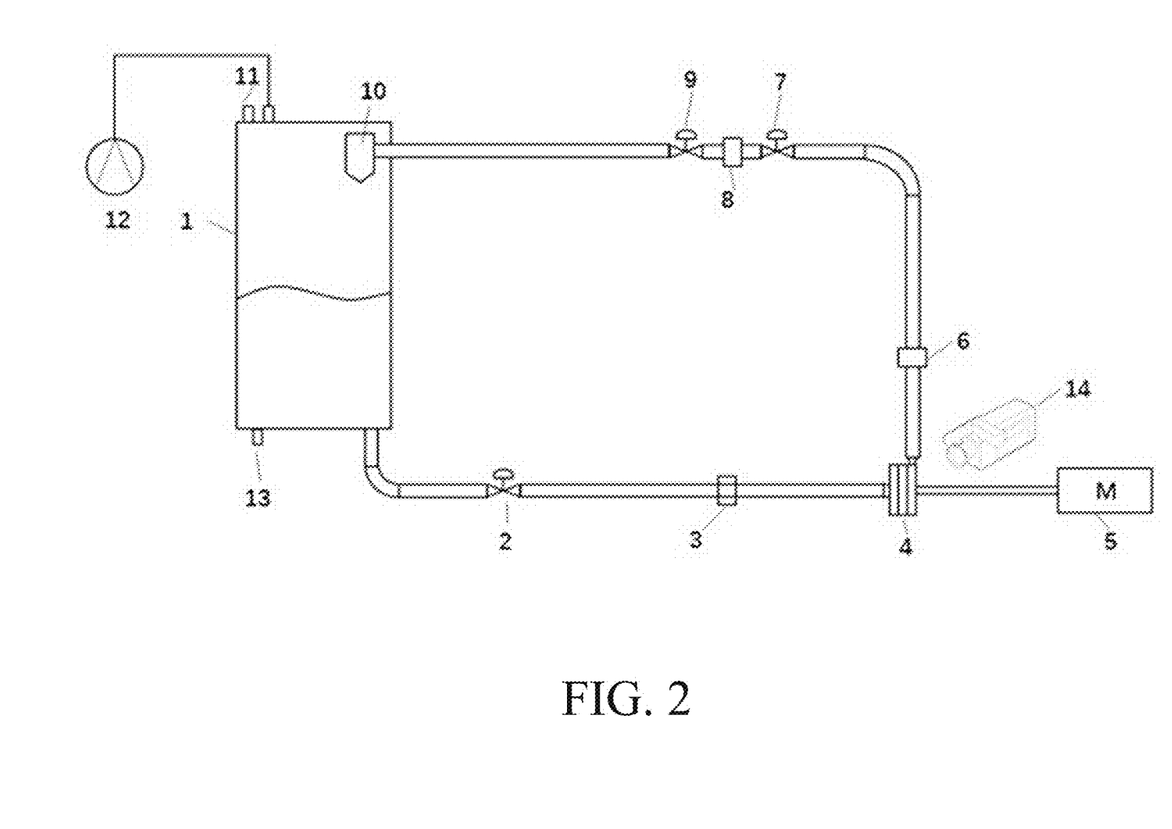
FIG. 2 is a schematic diagram of an experimental system for a cavitation test established in an embodiment of the present invention.

In this example, in order to achieved the above cavitation state identification method driven by vibration data of fluid machinery, a synchronous pump cavitation test experimental system including a test pump, a high-speed camera and a signal collection module is established, as shown in FIG. 2. In the system, basic components include a water storage tank 1, an inlet liquid flowmeter 2, an inlet differential pressure sensor 3, a test pump 4, a drive motor 5, an outlet differential pressure sensor 6, an outlet valve 7, an outlet liquid flowmeter 8, an outlet regulating valve 9, a cyclone separator 10, an exhaust valve 11, a vacuum pump 12, a water drain valve 13, and a high-speed camera 14. The water storage tank 1 is sequentially connected to the inlet liquid flowmeter 2, the inlet differential pressure sensor 3, the test pump 4, the outlet differential pressure sensor 6, the outlet valve 7, the outlet liquid flowmeter 8, the outlet regulating valve 9 and the cyclone separator 10 through pipes, and then a water flow is recycled back to the water storage tank 1 after internal bubbles are separated by the cyclone separator 10. An output shaft of the drive motor 5 is connected to the test pump 4 for driving the pump to work, and the drive motor 5 is a three-phase asynchronous motor with a variable frequency controller. A vibration sensor is installed on the test pump 4.

In the system, the vibration sensor and the high-speed camera may be cooperatively controlled by a synchronous controller, such that collected information is guaranteed to come from the same cavitation working condition.

In this embodiment, the pump is operated at a constant speed of 1500 rpm and a flow rate of 20 m³/h. A device for collecting a vibration signal includes a PCB35 vibration sensor and a magnetic holder. The vibration sensor and the magnetic holder are attached to a surface of a pump housing with transparent double-sided adhesive tape. For an attractive iron pump housing or a pipe, the sensor is directly attracted by the magnetic holder. The vibration signals are collected by means of the NI data collection system. A collection frequency is 25600 Hz. A total of 8 vibration sensors are arranged at parts of the pump, including 1 at an inlet, one at an outlet, and the other six on the rest of a pump body. For each cavitation state, the sensors collect signals at the corresponding positions and save the signals in a form of matrix, with a formula as follows:

$$X = \begin{bmatrix} x_{1,1} & \cdots & x_{8,1} \\ \vdots & \ddots & \vdots \\ x_{1,8} & \cdots & x_{8,8} \end{bmatrix}$$

The pump housing is made of transparent organic glass. Visualization is recorded by using the high-speed camera, full resolution of 1024*1024 pixels is provided, and a Nikon 50 mm/f1.8 imaging lens is equipped to guarantee a reasonable focus distance. A collection rate is 4000 fps for all tests. Slice illumination of a measurement region is provided by a continuous laser powered by a 24V direct current power supply.

Figure 3:
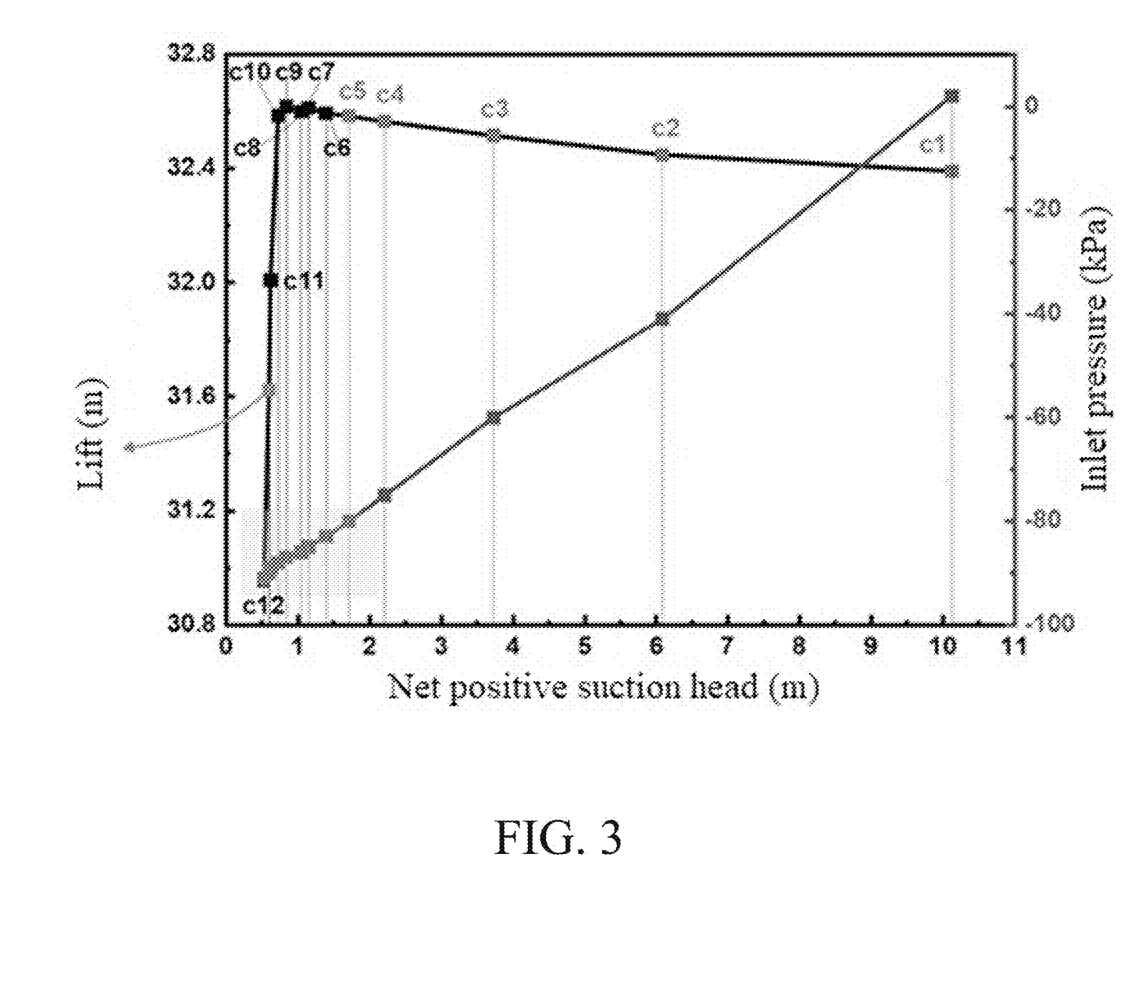
FIG. 3 shows an example of a cavitation characteristic curve in an embodiment of the present invention.

In the cavitation experiment for obtaining training sample data in the embodiment, clean water may be injected into the water storage tank 1, and the exhaust valve 11 and the water drain valve 13 are closed, such that a liquid path in the pump is isolated from the atmosphere. The outlet valve 7 is opened, the outlet regulating valve 9 is opened to 50% of an opening degree, and the drive motor 5 is started and regulated to a specified speed. According to a flow measured by the inlet liquid flowmeter 2, the flowrate is regulated by slowly changing the opening degree of the outlet regulating valve 9 until a required flow is reached. In a non-cavitation state, corresponding vibration signals and a cavitation image taken by the high-speed camera 14 are collected. An pressure between pump inlet and outlet is collected by the inlet differential pressure sensor 3 and the outlet differential pressure sensor 6. The vacuum pump 12 is started, and a pressure in the water storage tank is continuously reduced according to a preset pressure control point, so as to reduce the pressure at the pump inlet. The cavitation state develops from a non-cavitation state to an initial cavitation state and finally to a critical cavitation state. Each pressure control point is maintained for 15 minutes. Under a cavitation working condition lasting for about 15 minutes, a water temperature needs to be kept constant, and in the period of steady state time, corresponding net positive suction head, head, vibration signal and cavitation image under the cavitation working condition are collected. As shown in FIG. 3, a cavitation characteristic curve is formed from collected data at 12 pressure control points under a flow in the embodiment.

In the embodiment, when a training sample label is constructed, cavitation region identification and cavitation development degree quantification need to be performed on the taken image. A specific identification method and quantification method are as follows: develop a computer program for identifying a cavity boundary, capture a gas-liquid interface with large contrast by means of gray value similarity, and manually regulate some regions that are difficult to identify according to experience. An impeller flow passage region is obtained in the same way. A proportion of the identified cavitation region and the impeller flow passage region is determined through a pixel counting method, that is, the number of pixels contained in the cavitation region and the impeller flow passage region is measured separately. A ratio of the number of pixels of the cavitation region and the number of pixels of the impeller flow passage region represents a cavitation intensity, with a formula as follows:

$$C_r = \text{pixel}_{cavity}/\text{pixel}_{blade}$$

In the formula, $C_r$ represents the cavitation intensity, $\text{pixel}_{cavity}$ and $\text{pixel}_{blade}$ represents represent the included pixels of cavity area and region of flow passage between adjacent blades, respectively.

In the embodiment, FIG. 4 shows a designed one-dimensional convolutional neural network (1D-CNN) model, including an input layer (I), two convolutional pooling modules (C1 and C2), two multi-layer perceptron (MLP) layers (F1 and F2), and an output layer (O). The convolutional pooling module C1 further includes a convolutional layer C11 and a max pooling layer C12. The convolutional pooling module C2 further includes a convolutional layer C21 and a max pooling layer C22.

The input layer is configured to perform segment preprocessing on an original time sequence signals, to construct an input data set of the 1D-CNN. The time sequence signals are normalized and then divided in a sliding manner according to a fixed time window. A specific sliding length and a window width are determined according to optimization. Signal slices formed after division form a data set of the convolutional neural network model. For a vibration signal sequence $x_{i,j}$ sampled by the $i^{th}$ sensor under the $j^{th}$ cavitation condition, the original time sequence signals are normalized to a range with a mean value of 0 and a standard deviation of 1. A data sequence is then divided into n sequences with a constant sample length $n_L$. A slice length should guarantee to include at least vibration information of one rotation period, that is:

$$n_L \geq m*(60/n_0)*f$$

In the formula, $n_L$ is a signal length contained in each time sequence slice, and m is a positive integer, indicating that a signal rotating m circles in total is selected; and $n_0$ is a pump speed in r/min, and f is a sampling frequency in Hz.

With the $x_{i,j}$ signal sequence as an example, a sliced form is expressed as:

$$x_{i,j} = [x_{i,j}^1, x_{i,j}^2, \ldots, x_{i,j}^n]$$

In the formula, $x_{i,j}^1, x_{i,j}^2, \ldots, x_{i,j}^n$ represents the first to nth slices respectively.

In the embodiment, after computation according to the above formula, a data segment set of 480 vibration signals may be obtained. There are a total of 3840 data segments for 8 sensors.

The convolutional pooling module (marked as CNN layer) includes a convolutional layer and a max pooling layer. A plurality of convolution kernels in the convolutional layer are used to extract high-dimensional features of the original time sequence signals, to obtain a plurality of feature vectors. A max pooling operator reduces dimensions of the feature vectors, reduces complexity of the model and improves robustness of nonlinear features. In order to simplify a network topology and make the degrees of freedom of any input layer dimension independent of the parameters of the convolutional neural network, the convolutional layer and the pooling layer are stacked together and share weights, that is, one convolutional layer is followed by one max pooling layer. For the max pooling layer in the last convolutional pooling module, the size of the convolution kernel is adaptively changed to a dimension of the MLP input layer. The adaptive convolutional neural network topology design guarantees that signal segment data of any length can be input.

A computation process in the above CNN layer is formulated as follows:

$$x_k^l = b_k^l + \Sigma_{i=1}^{N_{l-1}} \text{conv} 1D(W_{ik}^{l-1}, s_i^{l-1})$$

$$y_k^l = f(x_k^l), s_k^l = y_k^l \downarrow \text{Subconv}$$

In the formula, $N_{l-1}$ is the number of neurons in the $(l-1)^{th}$ layer, $x_k^l$ is input of the $k^{th}$ neuron in the $l^{th}$ layer, $s_i^{l-1}$ represents input of the $i^{th}$ neuron in the $(l-1)^{th}$ layer, $W_{ik}^{l-1}$ is a weight matrix from the $i^{th}$ neuron in the $(l-1)^{th}$ layer to the $k^{th}$ neuron in the $l^{th}$ layer, $b_k^l$ is a deviation of the $k^{th}$ neuron in the $l^{th}$ layer, $y_k^l$ is obtained from $x_k^l$ through an activation function f of Tan h, and $\downarrow$Subconv represents zero-padding max pooling operation.

A mapping relation between the vibration information and a cavitation evolution form is established by means of synchronously collected signals. The cavitation intensity obtained by using the cavitation image is used as a label of the vibration signal. A training set signal is input into a constructed one-dimensional convolution neural network model, and a multi-scale feature vector of the signal is adaptively obtained by using one-dimensional convolution.

For a probability $\text{EMP}_{j,q}$ of the $q^{th}$ label under the $j^{th}$ working condition, a computation formula is as follows:

$$\text{EMP}_{j,q} = \frac{P_{1,j,q} + P_{2,j,q} + \cdots + P_{i,j,q}}{i}$$

In the formula, as for $P_{l,j}$, q represents a probability of the $q^{th}$ label under the $j^{th}$ working condition predicted by a vibration signal sequence collected by the $l^{th}$ vibration sensor; and i is the total number of the vibration sensors.

Hereafter, the trained cavitation state identification model is used to classify the training samples actually involved in the training. Results are shown in Table 1. Numerical values in the table are probabilities $EMP_{j,q}$, and c1-c12 are 12 sets of cavitation intensity labels corresponding to the training samples. It can be found that the cavitation state involved in the training can be effectively identified through the vibration signals through the method provided in the present invention.

TABLE 1

Classification results of training samples by cavitation state identification model

|  | Sensor #1 | Sensor #2 | Sensor #3 | Sensor #4 | Sensor #5 | Sensor #6 | Sensor #7 | Sensor #8 |
|---|---|---|---|---|---|---|---|---|
| c1 | 1 | 1 | 1 | 1 | 0.97 | 1 | 0.99 | 0.99 |
| c2 | 0.98 | 0.99 | 0.99 | 0.95 | 0.98 | 0.99 | 0.92 | 0.98 |
| c4 | 0.9 | 1 | 1 | 1 | 1 | 0.98 | 0.96 | 0.91 |
| c6 | 0.96 | 0.98 | 0.92 | 1 | 1 | 0.99 | 0.94 | 0.95 |
| c8 | 0.89 | 1 | 0.97 | 0.98 | 0.97 | 1 | 1 | 0.78 |
| c10 | 0.96 | 0.86 | 0.93 | 0.98 | 1 | 0.94 | 0.93 | 0.94 |
| c11 | 0.99 | 0.98 | 0.93 | 0.95 | 0.96 | 0.94 | 0.92 | 1 |
| c12 | 0.98 | 1 | 1 | 1 | 0.91 | 0.96 | 1 | 0.98 |

Furthermore, the trained network model is used to classify the cavitation intensity labels of the real samples not involved in the training. Moreover, in the embodiment, in order to verify an adaptive effect of the present invention, the samples not involved in training use vibration signal data of different lengths, which are respectively: vibration signal data of 4 seconds, vibration signal data of 19.2 seconds, and vibration signal data of 10 seconds. The result shows that the cavitation state identification model established in the present invention can effectively identify a cavitation state not involved in training. For example, a vibration signal collected in cavitation state c3 is input. The trained cavitation state identification model classifies the most input samples into label c2. However, some samples are classified into label c4. Since the identification accuracy of the established cavitation state identification model for the cavitation states involved in the training is higher than 95%, it is inferred that the input vibration signal is from cavitation state c3.

Therefore, the cavitation state identification model obtained by the above training in the present invention satisfies the accuracy requirement of application. In practical applications, the vibration signal sequences may be collected online by all the vibration sensors arranged at different positions of the target centrifugal pump, the collected vibration signal sequences are input into the cavitation state identification model obtained by training, and a current real-time cavitation intensity of the target centrifugal pump is predicted online.

In order to make the model perform regular autonomous learning, after a plurality of groups of online prediction results are obtained for the target centrifugal pump, a vibration signal sequence with a confidence coefficient higher than a threshold and a corresponding cavitation intensity are constructed as a new training sample, and expanded into the cavitation data set, the adaptive neural network is retrained, and the cavitation state identification model is updated.

In the embodiment, a specific standard for selecting training samples may be adjusted according to actual conditions. For example, when self-learning sample expansion is performed, under the condition that a probability $EMP_{j,q}$ predicted by one sample is greater than 0.95, it indicates that the identified cavitation state data is highly similar to the data set used for training the model, and the cavitation test set data is added to the training set of an original model, the number of samples in the model training set is continuously expanded, and the accuracy of the model is improved.

Moreover, in the above embodiment, there are 12 cavitation intensity labels, and a label granularity may be optimized and adjusted according to the actual situation. For example, in other embodiments, a finer granularity may be further set for the cavitation intensity label. With the refinement of the label granularity, the adaptive neural network may have a problem of difficulty in fitting, which not only increases a training time, but also reduces the model accuracy. Therefore, when the adaptive neural network is trained by means of the cavitation data set, to obtain a cavitation state identification model, all cavitation intensity labels may be divided into two or more groups (sorted according to cavitation intensity as far as possible, and similar labels are located in the same group), the cavitation data set is divided according to the cavitation intensity labels, each group of cavitation intensity labels forms a data sub-set, and each data sub-set trains an adaptive neural network, to form a corresponding cavitation state identification model, such that fitting difficulty of the adaptive neural network for the fine-grained labels is reduced. In an online prediction stage, the vibration signal sequences collected online may be input into each cavitation state identification model, current cavitation intensity labels of the target centrifugal pump and confidence coefficients of the current cavitation intensity labels are predicted online separately, and a cavitation intensity label with a highest confidence coefficient is selected as the final real-time cavitation intensity.

The above embodiment is merely a preferred solution of the present invention, but are not intended to limit the present invention. Various changes and modifications can be made by those ordinary skill in the art without departing from the spirit and scope of the present invention. All technical solutions obtained by means of equivalent substitution alternatively equivalent transformation fall within the scope of protection of the present invention.

The invention claimed is:

1. A cavitation state identification method driven by vibration data of fluid machinery, comprising:
S1: obtaining a cavitation data set constructed for a target centrifugal pump, wherein each training sample in the cavitation data set comprises input data and a label, the input data is vibration signal sequences collected by all vibration sensors arranged at different positions of the centrifugal pump under one cavitation condition, and the label is a cavitation intensity of the centrifugal pump under the cavitation condition corresponding to the input data; and the cavitation intensity is obtained by using an external imaging instrument to take an image of an impeller region in the pump during an operation process of the centrifugal pump with a transparent housing, and further computing a ratio of an area of a cavitation region identified from the image to an area of an impeller flow passage;

S2: training an adaptive neural network by means of the cavitation data set, to obtain a cavitation state identification model, wherein the adaptive neural network takes the vibration signal sequences collected by all the vibration sensors arranged at different positions of the centrifugal pump as input, extracts a high-dimensional feature of the input vibration signal sequences, and finally outputs a corresponding cavitation intensity prediction value by means of classification and regression; and S3: collecting the vibration signal sequences online by all the vibration sensors arranged at different positions of the target centrifugal pump, inputting the collected vibration signal sequences into the cavitation state identification model obtained by training, and predicting a current real-time cavitation intensity of the target centrifugal pump online.

2. The cavitation state identification method driven by vibration data of fluid machinery according to claim 1, wherein after a plurality of groups of online prediction results are obtained for the target centrifugal pump, a vibration signal sequence with a confidence coefficient higher than a threshold and a corresponding cavitation intensity are constructed as a new training sample, and expanded into the cavitation data set, the adaptive neural network is retrained, the cavitation state identification model is updated, and the model performs regular autonomous learning.

3. The cavitation state identification method driven by vibration data of fluid machinery according to claim 1, wherein the cavitation data set is obtained by installing a test pump in a test system for a multi-working condition test, a housing of the test pump is made of a transparent material, and an internal structure of the test pump is identical to that of the target centrifugal pump.

4. The cavitation state identification method driven by vibration data of fluid machinery according to claim 3, wherein a specific method of the multi-working condition test comprises:

sampling different flow conditions within a flow regulation range of the target centrifugal pump, and performing a cavitation test on the test pump under each flow condition; during each cavitation test, firstly, guaranteeing that a flow in the test pump is stable under a current flow condition, then reducing inlet pressure of the test pump gradually according to a preset pressure control point, to generate cavitation in the test pump gradually, maintaining a period of steady state time at each pressure control point, collecting vibration signal sequences by vibration sensors arranged at different positions on the test pump separately in the period of steady state time, and simultaneously taking an image of an impeller region in the pump through the transparent shell by means of an imaging instrument arranged outside the test pump; and identifying a cavitation region and an impeller flow passage according to the captured image of the impeller region in the pump, and taking a ratio of the number of pixels of the cavitation region to the number of pixels of the impeller flow passage as a cavitation intensity under the corresponding flow condition and pressure control point.

5. The cavitation state identification method driven by vibration data of fluid machinery according to claim 4, wherein when the test pump is subject to the cavitation test, the test pump is connected to a tank for supplying water, and the inlet pressure of the test pump is changed by regulating a negative pressure degree in the tank.

6. The cavitation state identification method driven by vibration data of fluid machinery according to claim 1, wherein the adaptive neural network uses an adaptive one-dimensional convolutional neural network model, and the model is formed by cascading an input layer, a plurality layers of convolutional pooling modules, a fully-connected layer and an output layer;

in the input layer, the input vibration signal sequences are firstly normalized, and then the vibration signal sequence of each sensor is divided into a series of sequence slices in a sliding manner according to a fixed time window, wherein each sequence slice has a length at least covering one rotation period of a centrifugal pump impeller;

each layer of convolutional pooling module is composed of a convolutional layer and a max pooling layer in cascade, wherein input of the convolutional layer is output of a previous network layer, activation function output of the convolutional layer serves as input of the max pooling layer, and output of the max pooling layer serves as input of a next network layer; and the max pooling layer of the last layer of convolutional pooling module adaptively regulates a size of a convolution kernel, such that an output feature vector is adapted to an input dimension of the output layer;

in the fully-connected layer, fully-connected operation is performed on the feature vector output by the last layer of convolutional pooling module; and in the output layer, a prediction label of the cavitation intensity is obtained by performing classification and regression on a feature vector output by the fully-connected layer.

7. The cavitation state identification method driven by vibration data of fluid machinery according to claim 1, wherein in the adaptive neural network, a probability distribution of a cavitation intensity label corresponding to the vibration signal sequence collected by each vibration sensor is output separately, then the probability distributions of the cavitation intensity labels corresponding to all the vibration sensors are averaged, and a cavitation intensity label with a maximum probability is selected from the average probability distribution as the final output cavitation intensity prediction value.

8. The cavitation state identification method driven by vibration data of fluid machinery according to claim 1, wherein when the adaptive neural network is trained in S2, all cavitation intensity labels are grouped first, then the cavitation data set is divided according to the cavitation intensity labels, each group of cavitation intensity labels obtains a data sub-set, and each data sub-set is used to train an adaptive neural network, to form a corresponding cavitation state identification model; and when online prediction is performed in S3, the vibration signal sequences collected online are input into each cavitation state identification model, current cavitation intensity labels of the target centrifugal pump and confidence coefficients of the current cavitation intensity labels are predicted online separately, and a cavitation intensity label with a highest confidence coefficient is selected as the final real-time cavitation intensity.

9. The cavitation state identification method driven by vibration data of fluid machinery according to claim 1, wherein the imaging instrument is a high-speed camera.

10. The cavitation state identification method driven by vibration data of fluid machinery according to claim 1, wherein the vibration sensors on the target centrifugal pump are respectively arranged on a pump inlet, a pump outlet and a housing between the inlet and the outlet.

\* \* \* \* \*